United States Patent
Wilton et al.

(10) Patent No.: US 11,047,469 B2
(45) Date of Patent: Jun. 29, 2021

(54) SCAVENGING PUMP FOR AN AUTOMATIC TRANSMISSION

(71) Applicant: GM Global Technology Operations LLC, Detroit, MI (US)

(72) Inventors: Daryl A. Wilton, Macomb, MI (US); Clinton E. Carey, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 16/363,583

(22) Filed: Mar. 25, 2019

(65) Prior Publication Data

US 2020/0309248 A1    Oct. 1, 2020

(51) Int. Cl.
| | | |
|---|---|---|
| *F16H 57/04* | (2010.01) | |
| *F16H 47/06* | (2006.01) | |
| *F16H 57/02* | (2012.01) | |

(52) U.S. Cl.
CPC ......... *F16H 57/0476* (2013.01); *F16H 47/06* (2013.01); *F16H 57/02* (2013.01); *F16H 57/0441* (2013.01); *B60Y 2200/92* (2013.01); *F16H 2057/02034* (2013.01)

(58) Field of Classification Search
CPC .. F16H 57/0441; F16H 57/0476; F16H 47/06; F16H 57/02; F16H 2057/02034; B60Y 2200/92

See application file for complete search history.

(56) References Cited

U.S. PATENT DOCUMENTS

| | | | | |
|---|---|---|---|---|
| 2,565,203 | A * | 8/1951 | Churchill | F16H 41/24 60/330 |
| 3,164,034 | A * | 1/1965 | Kelley | F16H 47/08 475/70 |
| 3,164,035 | A * | 1/1965 | Ellis | F16H 47/08 477/127 |
| 3,800,913 | A * | 4/1974 | Schmitt | F01M 1/12 184/6.13 |
| 4,195,480 | A * | 4/1980 | Shelby | F04C 11/00 418/200 |
| 2014/0091023 | A1 * | 4/2014 | Long | F16N 7/36 210/167.08 |
| 2014/0105728 | A1 * | 4/2014 | Frait | F16H 57/0441 415/122.1 |
| 2017/0058895 | A1 * | 3/2017 | Schultz | F04C 2/102 |
| 2017/0101004 | A1 * | 4/2017 | Frait | B60K 17/10 |
| 2020/0340475 | A1 * | 10/2020 | Parrish | F04C 15/064 |

FOREIGN PATENT DOCUMENTS

GB    930726 A *    7/1963    ............. F16H 47/06

* cited by examiner

*Primary Examiner* — Terence Boes
(74) *Attorney, Agent, or Firm* — Cantor Colburn LLP

(57) ABSTRACT

An automatic transmission includes a transmission housing having a sump portion, a main transmission fluid pump arranged at the sump portion, and a recess having a fluid return passage. A torque converter mounted in the recess and a scavenging pump arranged in the sump portion and fluidically connected to the fluid return passage.

18 Claims, 7 Drawing Sheets

SCAVENGING PUMP FOR AN AUTOMATIC TRANSMISSION

INTRODUCTION

The subject disclosure relates to the art of automatic transmissions and, more particularly, to a scavenging pump for an automatic transmission.

Automatic transmissions provide a plurality of gears that may be selectively activated or engaged by application of one or more brakes or clutches. A clutch is typically located in a torque converter that receives hydraulic fluid from a pump arranged in the transmission. When employed in connection with a hybrid vehicle, an electric motor may be connected to the torque converter. Coolant from the electric motor may flow into the automatic transmission.

The automatic transmission includes a transmission fluid pump that guides fluid from a transmission sump through various passages to activate selected gears and through a cooling system. The transmission fluid pump may also deliver the fluid to the electric motor. In current systems, electric motor coolant may pool in areas of a bell housing of the automatic transmission. At such times, coolant delivery may be affected. Accordingly, it is desirable to provide a system for delivering such pooled electric motor coolant back to the transmission sump.

SUMMARY

In one exemplary embodiment, an automatic transmission includes a transmission housing having a sump portion, a main transmission fluid pump arranged at the sump portion, and a recess having a fluid return passage. A torque converter mounted in the recess and a scavenging pump arranged in the sump portion and fluidically connected to the fluid return passage.

In addition to one or more of the features described above or below, or as an alternative, further embodiments could include wherein the scavenging pump is operatively connected with the main transmission fluid pump.

In addition to one or more of the features described above or below, or as an alternative, further embodiments could include wherein main transmission fluid pump includes a pump shaft operatively connected to the scavenging pump.

In addition to one or more of the features described above or below, or as an alternative, further embodiments could include wherein the scavenging pump includes a scavenging pump member supported by the pump shaft.

In addition to one or more of the features described above or below, or as an alternative, further embodiments could include wherein the scavenging pump includes a pump housing having a first housing portion connected to a second housing portion, the first and second housing portions surround the scavenging pump member and includes an outlet that projects radially outwardly and upwardly.

In addition to one or more of the features described above or below, or as an alternative, further embodiments could include wherein the recess includes an opening sized to receive the scavenging pump.

In addition to one or more of the features described above or below, or as an alternative, further embodiments could include further comprising: a cover arranged in the recess over the opening, the cover including an angled surface portion configured to direct motor oil to the scavenging pump.

In addition to one or more of the features described above or below, or as an alternative, further embodiments could include an electric motor arranged in the recess, the electric motor including a rotor.

In addition to one or more of the features described above or below, or as an alternative, further embodiments could include wherein the rotor is mechanically linked to the torque converter.

In another exemplary embodiment, an automatic transmission includes a transmission housing having a sump portion and a main transmission fluid pump arranged at the sump portion and a recess including a fluid return passage. A torque converter is mounted in the recess. An electric motor housing is connected with the transmission housing. An electric motor is arranged in the electric motor housing and mechanically connected to the torque converter, and a scavenging pump is arranged in the sump portion and fluidically connected to the fluid return passage.

In addition to one or more of the features described above or below, or as an alternative, further embodiments could include wherein the scavenging pump is operatively connected with the main transmission fluid pump.

In addition to one or more of the features described above or below, or as an alternative, further embodiments could include wherein the main transmission fluid pump includes a pump shaft that is operatively connected with.

In addition to one or more of the features described above or below, or as an alternative, further embodiments could include wherein the scavenging pump includes a scavenging pump member supported by the pump shaft.

In addition to one or more of the features described above or below, or as an alternative, further embodiments could include wherein the electric motor housing includes an opening defining the motor oil return passage, the opening being sized to receive the scavenging pump.

In addition to one or more of the features described above or below, or as an alternative, further embodiments could include a cover arranged in the recess of the transmission housing over the fluid return passage, the cover including an angled surface portion configured to direct motor oil to the scavenging pump.

In yet another exemplary embodiment, a method of scavenging fluid from a recess receptive of a torque converter of a transmission includes collecting fluid in the recess of the transmission in the recess, directing the fluid toward a scavenging pump fluidically exposed in the recess, and recirculating the fluid collecting in the recess through the transmission.

In addition to one or more of the features described above or below, or as an alternative, further embodiments could include wherein recirculating the fluid includes rotating a scavenging pump operatively connected to a main transmission fluid pump.

In addition to one or more of the features described above or below, or as an alternative, further embodiments could include wherein directing the fluid toward the scavenging pump includes passing the fluid through an opening formed in the cavity towards a sump portion of the transmission.

In addition to one or more of the features described above or below, or as an alternative, further embodiments could include wherein passing the fluid through the openings includes guiding the fluid along an angled surface portion formed in a cover extending across the opening.

In addition to one or more of the features described above or below, or as an alternative, further embodiments could include wherein collecting the fluid in the recess includes collecting fluid from an electric motor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
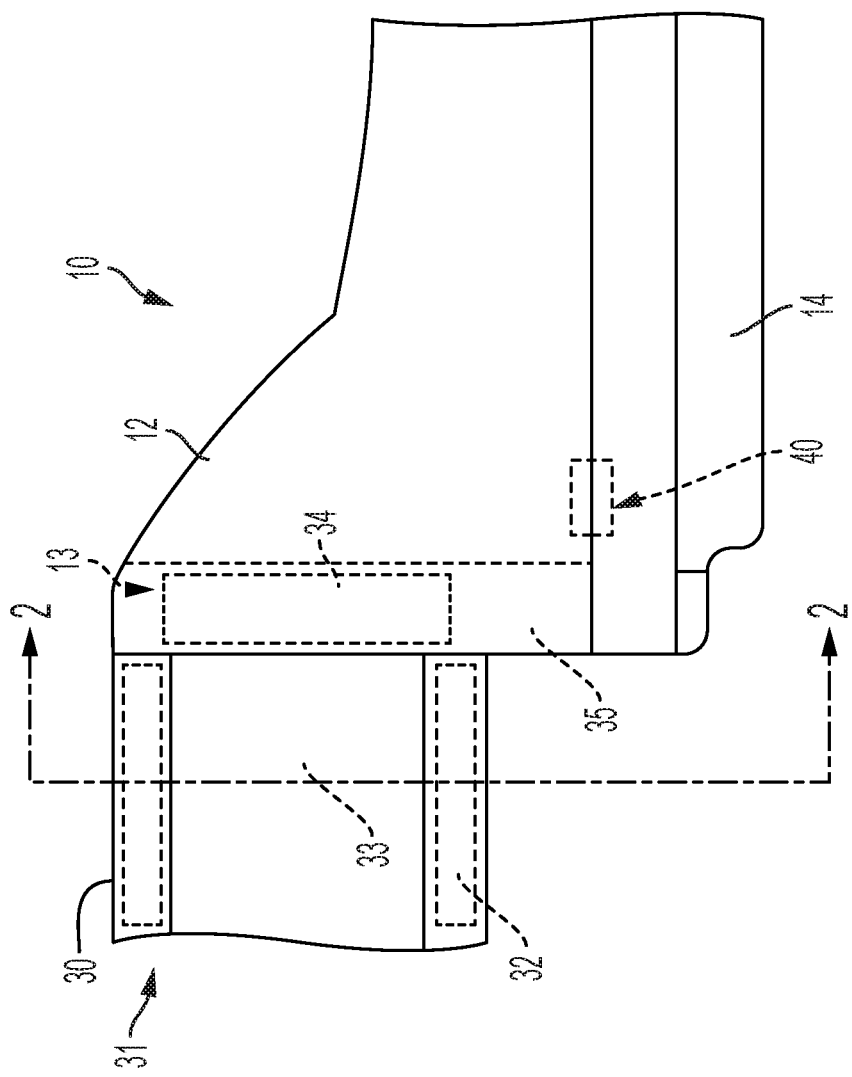
FIG. 1 depicts a schematic view of an electric motor coupled to a transmission assembly having a scavenging pump, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features.

An automatic transmission system, in accordance with an exemplary embodiment, is indicated generally at 10 in FIGS. 1-4. Automatic transmission system 10 includes a transmission housing 12 having a bellhousing portion 13 and a sump portion 14. A main transmission fluid pump 18 (FIG. 2) is arranged in sump portion 14. As will be detailed herein, main transmission fluid pump 18 is driven by a gear 20 and operates to deliver a fluid, such as a hydraulic fluid, that may take the form of automatic transmission fluid, about transmission system 10.

In an embodiment, transmission housing 12 is coupled to an electric motor housing 30 that surrounds an electric motor 31 including a stator 32 having a rotor 33. Rotor 33 may be connected to a torque converter 34 of transmission system 10, which may be configured operate main transmission fluid pump 18. Transmission housing 12 includes a recess 35 defined by bellhousing portion 13 that is receptive of torque converter 34. Recess 35 includes a fluid passage 36. Fluid, which may take the form of motor oil, may pass from recess 35 through fluid passage 36 into sump portion 14 as will be detailed herein. At this point it should be understood that the term "motor oil" refers to oil that exists for electric motor 31. The oil may be used as a coolant, a lubricant or both and could take the form of automatic transmission fluid.

Figure 2:
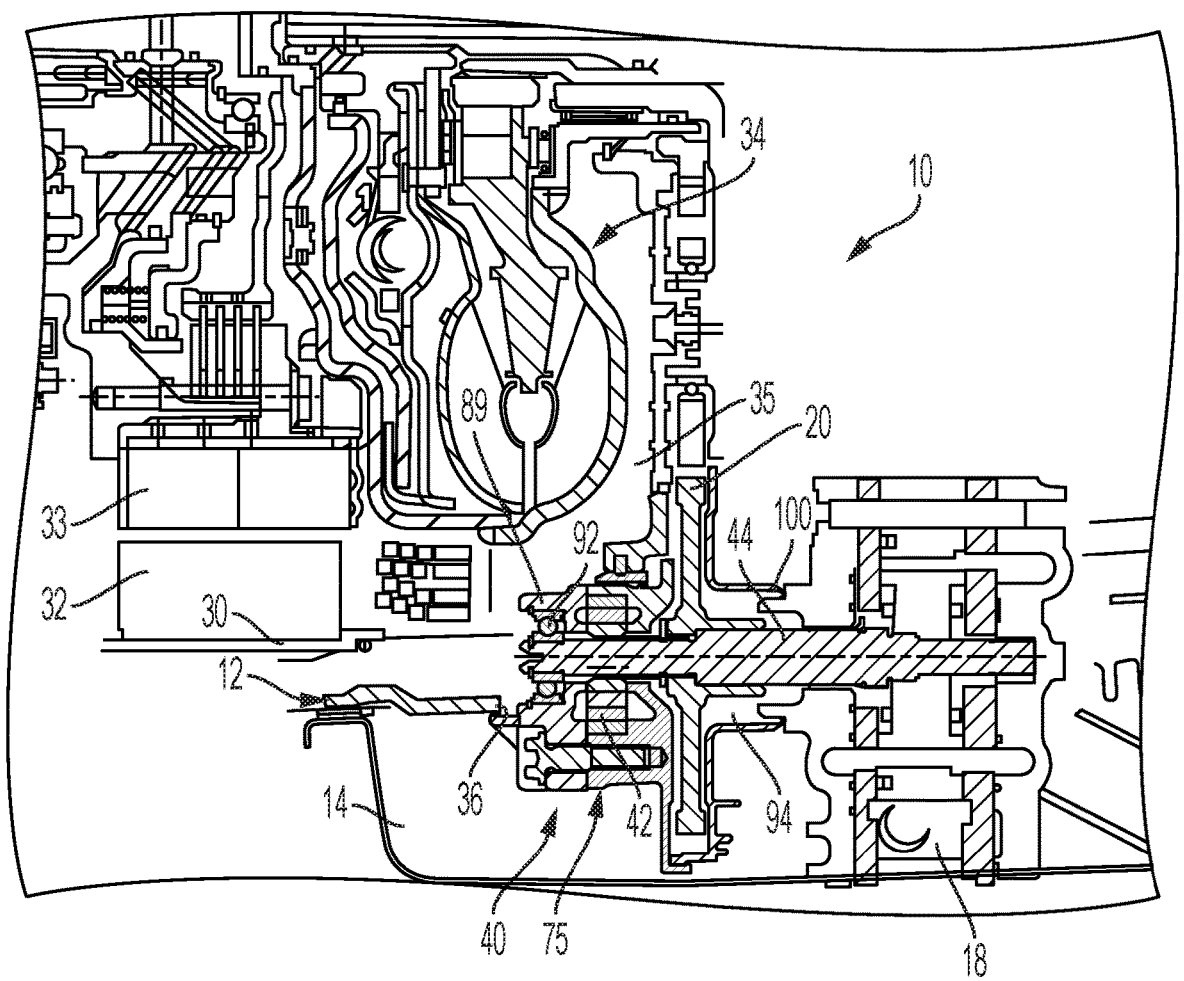
FIG. 2 depicts a partial cross-sectional view of the electric motor and transmission assembly of FIG. 1 taken at 2-2, in accordance with an aspect of an exemplary embodiment.
Figure 3:
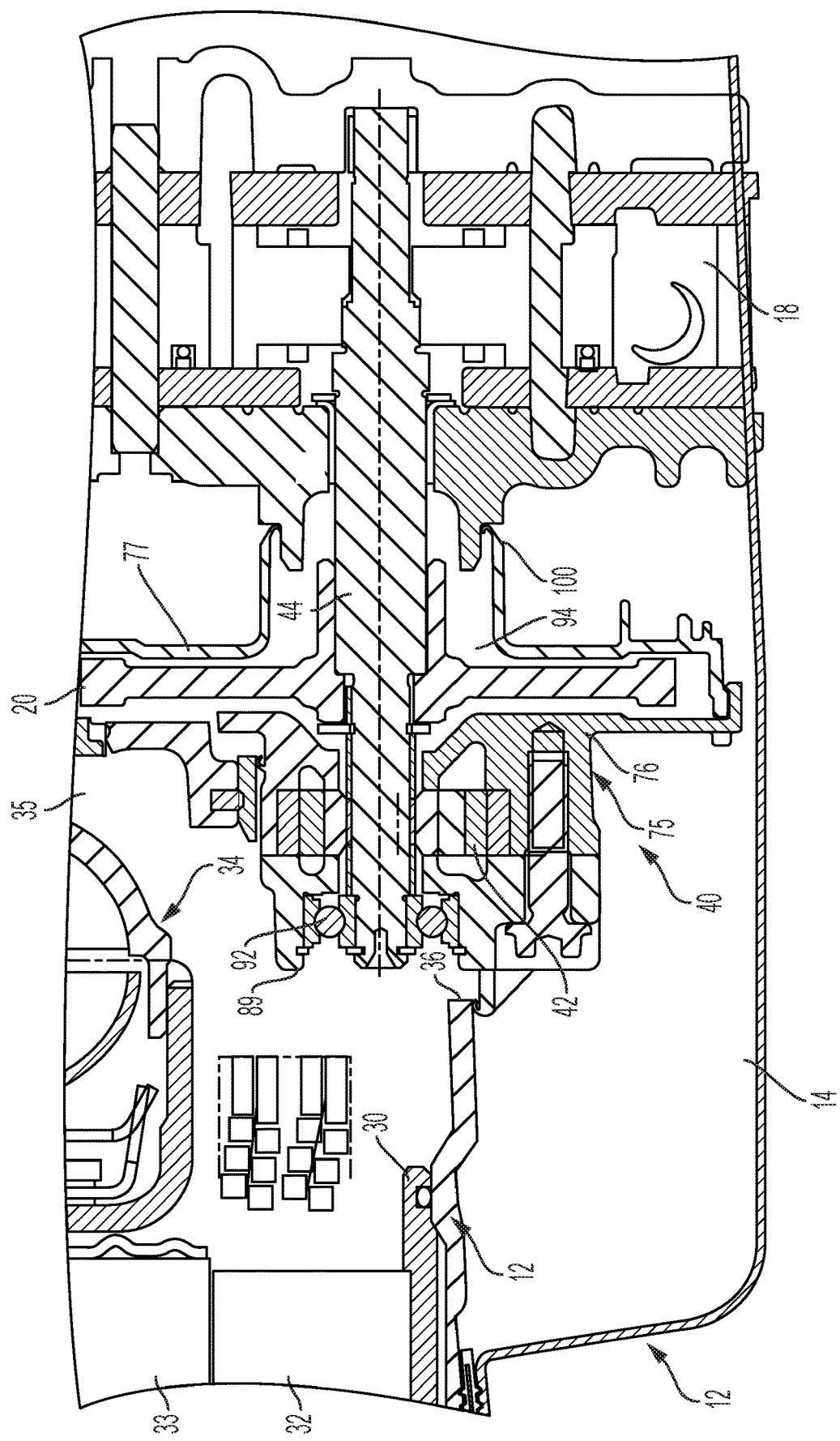
FIG. 3 depicts a partial cross-sectional of the scavenging pump of FIG. 2, in accordance with an aspect of an exemplary embodiment.

Referring to FIG. 3, and with continued reference to FIGS. 1 and 2, automatic transmission system 10 also includes a scavenging pump 40 having a scavenging pump member 42 that is fluidically connected between fluid passage 36 and sump portion 14. Scavenging pump member 42 may take the form of a scavenging pump gear (not separately labeled) or may include a plurality of pump vanes (not shown). Scavenging pump 40 may include a pump shaft 44 that is associated with main transmission fluid pump 18. Gear 20 and scavenging pump member 42 are supported by pump shaft 44. Gear 20 is driven by torque converter 34 to rotate shaft 44 and, in turn, drives scavenging pump member 42 and main pump 18. That is, gear 20 not only drives main transmission fluid pump 18 to circulate fluid within transmission system 10 but may also drive scavenging pump member 42 to move fluid from recess 35 into sump portion 14. Pump shaft 44 may be a single piece design as shown or may be formed as multiple components.

Figure 4:
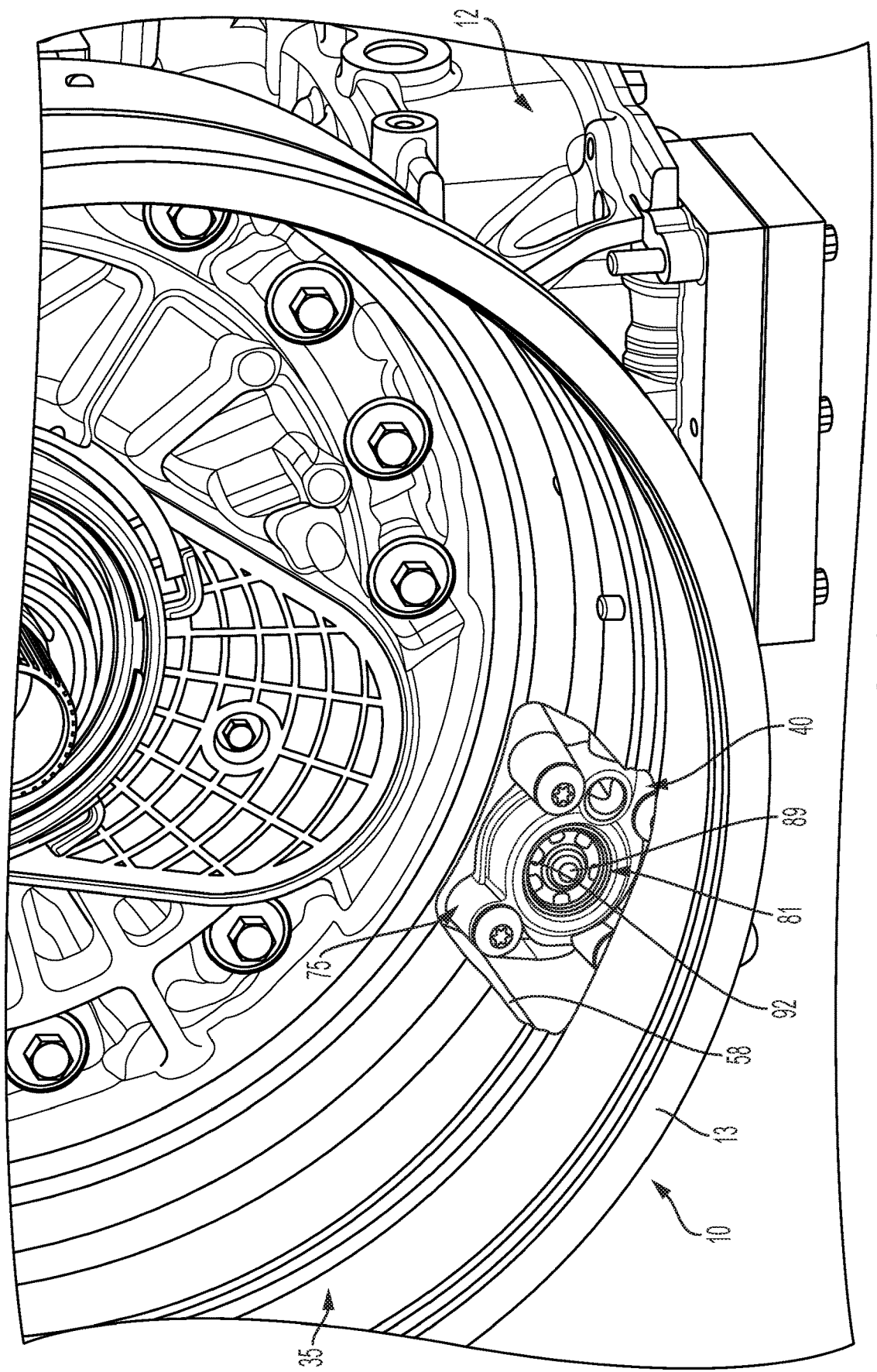
FIG. 4 depicts a partial perspective view of a bellhousing portion of the automatic transmission of FIG. 2 without a torque converter depicting an opening receptive of the scavenging pump, in accordance with an exemplary embodiment.
Figure 5:
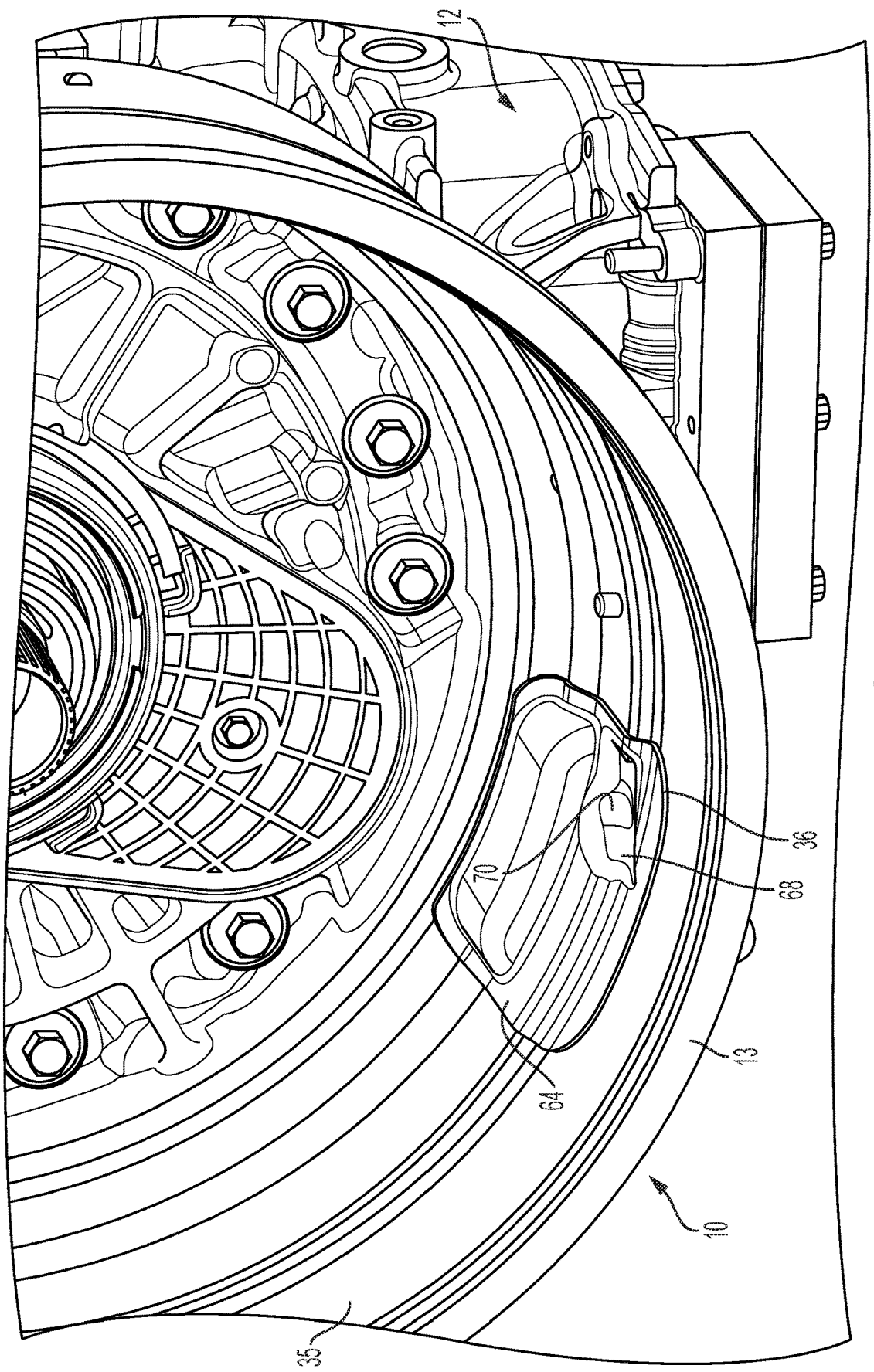
FIG. 5 depicts a partial perspective view of the bellhousing portion of the automatic transmission of FIG. 4 depicting an inlet cover over the opening, in accordance with an exemplary embodiment.

Referring to FIG. 4, and with continued reference to FIGS. 1-3, recess 35 may include an opening 58 defining a fluid return passage (not separately labeled) that is sized to receive scavenging pump 40. That is, opening 58 is large enough so that scavenging pump 40 may fit between torque converter 34 and main transmission pump 18. As will be detailed herein, opening 58 may be provided with a cover 64 (FIG. 5) that includes an angled surface portion 68 that guides motor oil toward an opening 70 exposed to scavenging pump 40. Cover 64 may support a filter (not shown) that could remove impurities from the motor oil. Of course, depending on design constraints, cover 64 may not be included.

Figure 6:
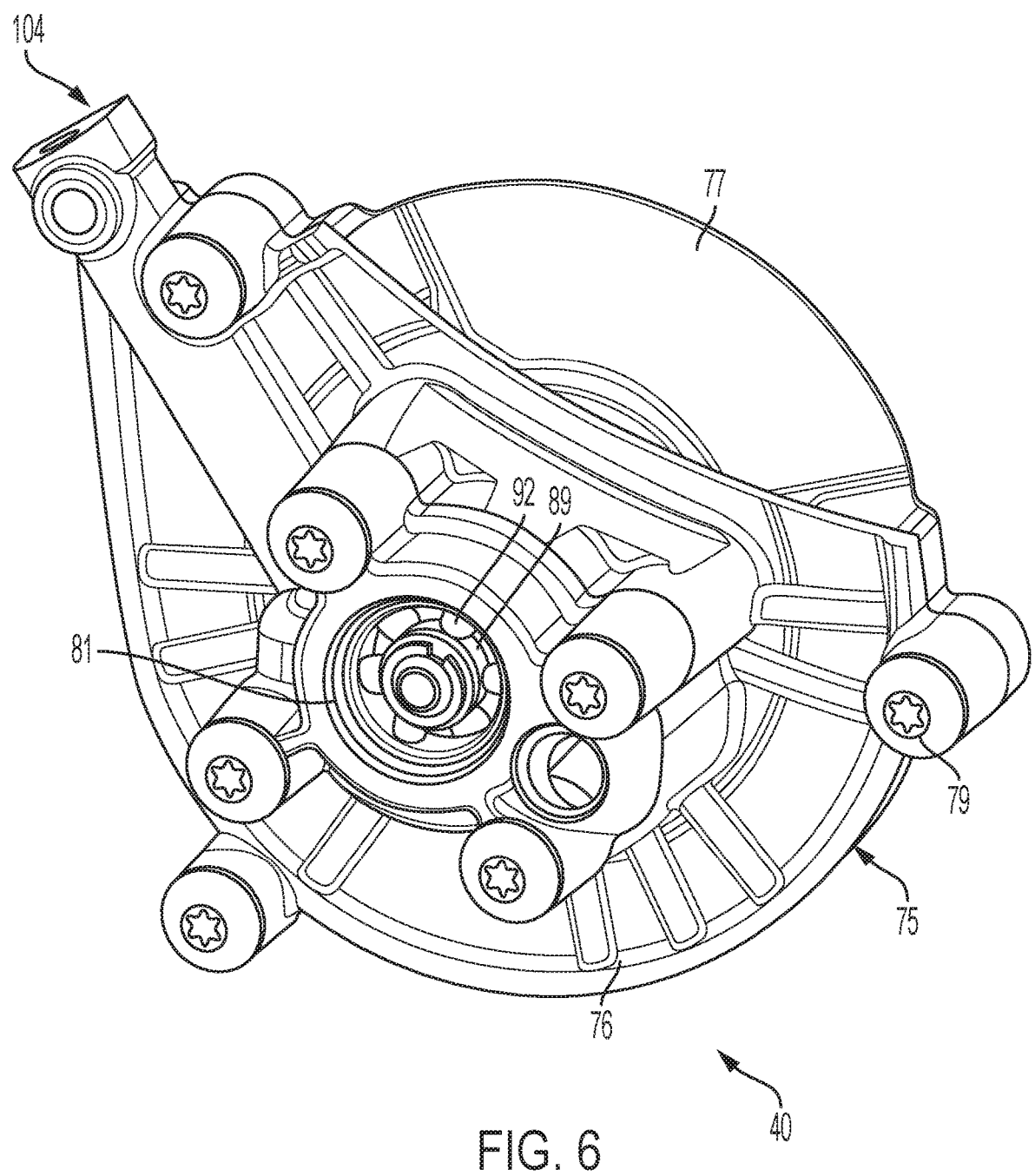
FIG. 6 depicts a partial perspective front view of a scavenging pump housing, in accordance with an aspect of an exemplary embodiment.
Figure 7:
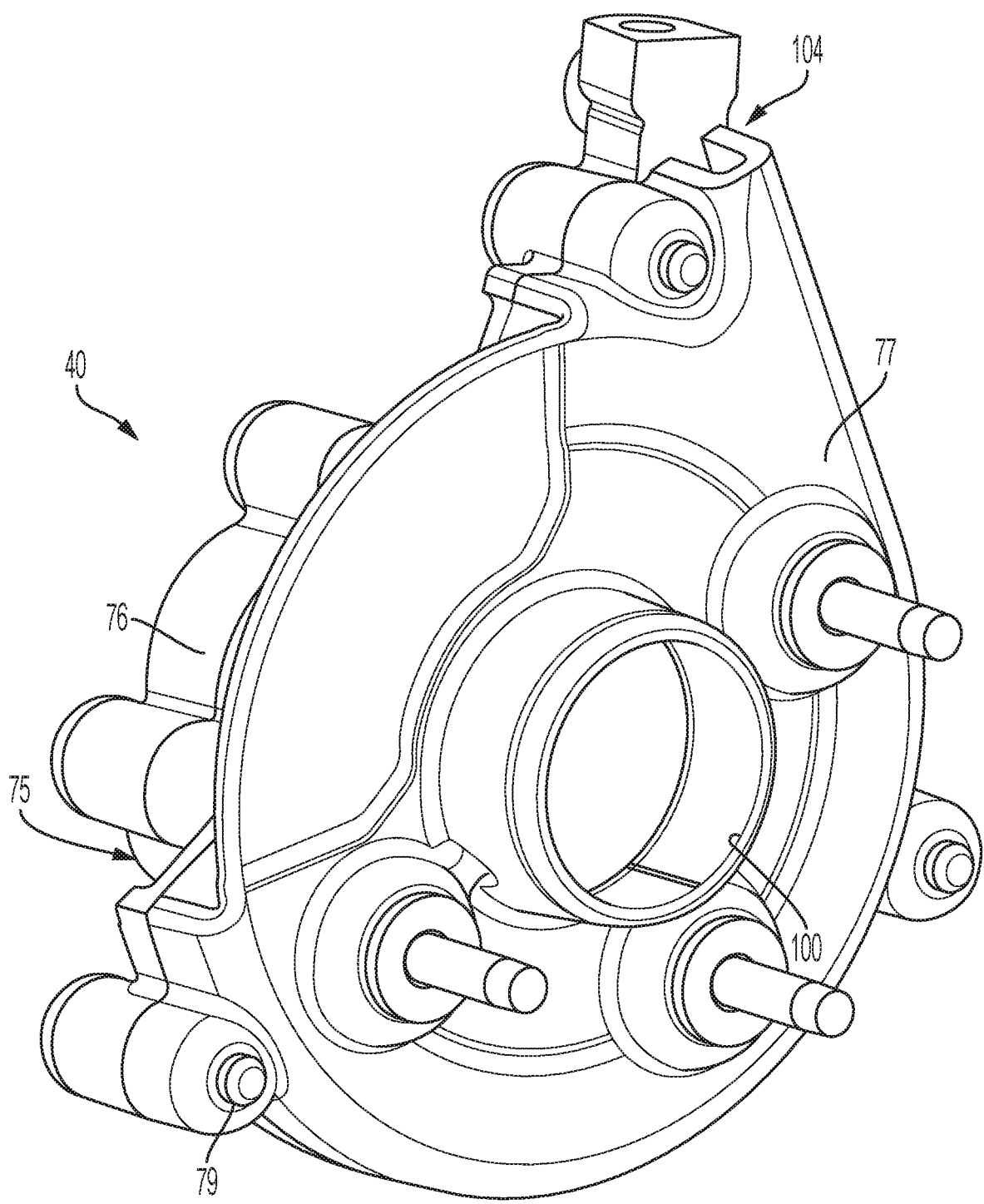
FIG. 7 depicts a partial perspective rear view of the scavenging pump housing of FIG. 6, in accordance with an aspect of an exemplary embodiment.

Reference will now follow to FIGS. 6 and 7, and with continued reference to FIGS. 2-3, in describing scavenging pump 40. Scavenging pump 40 includes a pump housing 75 having a first housing portion 76 and a second housing portion 77 that are joined by a plurality of fasteners, one of which is shown at 79. First housing portion 76 includes an inlet 81 including a central support 89 that includes a bearing 92. Bearing 92 supports a terminal end (not separately labeled) of pump shaft 44. Gear 20 is arranged in a cavity 94 defined between first housing portion 76 and second housing portion 77. Scavenging pump member 42 is arranged in first housing portion 76 adjacent to bearing 92. It should however be understood that while shown mounted to a terminal end of shaft 44 in first housing portion 76, it should be understood that the particular location of scavenging pump member 42 may vary. That is, scavenging pump member 42 may be arranged in cavity 94 or axially outwardly of opening 100.

Second housing portion 77 includes an opening 100 that receives pump shaft 44. Opening 100 may support a seal (also not separately labeled) that extends about pump shaft 44. First and second housing portions 76 and 77, when joined, may define an outlet 104 that projects radially outwardly and upwardly from sump portion 14 into transmission system 10. Outlet 104 may direct the electric motor oil back through automatic transmission system 10 and/or back to electric motor stator 31.

At this point, it should be understood that the exemplary embodiments describe an automatic transmission system that includes a first pump for distributing transmission fluid and a second pump for scavenging electric motor oil. The first pump may distribute automatic transmission fluid about the automatic transmission while the second pump may guide electric motor oil that may collect in a bellhousing portion back into the automatic transmission or back to the electric motor. The second pump may be fluidically connected to a recess provided in the bellhousing portion that may collect fluid from the electric motor. The electric motor provides power to a vehicle through the automatic transmission.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An automatic transmission comprising:
   a transmission housing including a sump portion, a main transmission fluid pump arranged at the sump portion, and a recess having a fluid return passage defined by an opening in the recess;
   a torque converter mounted in the recess, the fluid return passage being radially offset from an axis of rotation of the torque converter; and
   a scavenging pump arranged in the sump portion and fluidically connected to the fluid return passage, wherein the scavenging pump is selectively removeable through the opening in the recess.

2. The automatic transmission according to claim 1, wherein the scavenging pump is operatively connected with the main transmission fluid pump.

3. The automatic transmission according to claim 1, wherein the main transmission fluid pump includes a pump shaft operatively connected to the scavenging pump.

4. The automatic transmission according to claim 3, wherein the scavenging pump includes scavenging pump member supported by the pump shaft.

5. The automatic transmission according to claim 4, wherein the scavenging pump includes a pump housing having a first housing portion connected to a second housing portion, the first and second housing portions surround the scavenging pump member and includes an outlet that projects radially outwardly and upwardly.

6. The automatic transmission according to claim 1, further comprising: a cover arranged in the recess over the opening, the cover including an angled surface portion configured to direct motor oil to the scavenging pump.

7. The automatic transmission according to claim 1, further comprising: an electric motor arranged in the recess, the electric motor including a rotor.

8. The automatic transmission according to claim 7, wherein the rotor is mechanically linked to the torque converter.

9. An automatic transmission comprising:
   a transmission housing including a sump portion and a main transmission fluid pump arranged at the sump portion and a recess having a fluid passage defined by an opening in the recess;
   a torque converter mounted in the recess, the fluid return passage being radially offset from an axis of rotation of the torque converter;
   an electric motor housing connected with the transmission housing;
   an electric motor arranged in the electric motor housing and mechanically connected to the torque converter; and
   a scavenging pump arranged in the sump portion and fluidically connected to the fluid return passage, wherein the scavenging pump is selectively removeable through the opening in the recess.

10. The automatic transmission according to claim 9, wherein the scavenging pump is operatively connected with the main transmission fluid pump.

11. The automatic transmission according to claim 9, wherein the main transmission fluid pump includes a pump shaft that is operatively connected with the scavenging pump.

12. The automatic transmission according to claim 11, wherein the scavenging pump includes a scavenging pump member supported by the pump shaft.

13. The automatic transmission according to claim 9, further comprising: a cover arranged in the recess of the transmission housing over the cover including an angled surface portion configured to direct motor oil to the scavenging pump.

14. A method of scavenging fluid from a recess receptive of a torque converter of a transmission comprising:
   collecting fluid in the recess receptive of the torque converter of the transmission;
   directing the fluid toward a scavenging pump fluidically exposed in the recess; and
   recirculating the fluid collecting in the recess through the transmission.

15. The method of claim 14, wherein recirculating the fluid includes rotating a scavenging pump operatively connected to a main transmission fluid pump.

16. The method of claim 14, wherein directing the fluid toward the scavenging pump includes passing the fluid through an opening formed in the recess towards a sump portion of the transmission.

17. The method of claim 16, wherein passing the fluid through the opening includes guiding the fluid along an angled surface portion formed in a cover extending across the opening.

18. The method of claim 14, wherein collecting the fluid in the recess includes collecting fluid from an electric motor.

* * * * *